(12) United States Patent
Swatek

(10) Patent No.: US 10,739,603 B2
(45) Date of Patent: Aug. 11, 2020

(54) LASER POINTER

(71) Applicant: Alexander Swatek, Vienna (AT)

(72) Inventor: Alexander Swatek, Vienna (AT)

( * ) Notice: Subject to any disclaimer, the term of this patent is extended or adjusted under 35 U.S.C. 154(b) by 0 days.

(21) Appl. No.: 16/526,239

(22) Filed: Jul. 30, 2019

(65) Prior Publication Data

US 2019/0353914 A1 Nov. 21, 2019

Related U.S. Application Data

(62) Division of application No. 16/137,896, filed on Sep. 21, 2018, now abandoned.

(30) Foreign Application Priority Data

Jan. 30, 2018 (EP) ..................................... 18154213

(51) Int. Cl.
| | | |
|---|---|---|
| *G02B 27/20* | (2006.01) | |
| *G06F 3/0346* | (2013.01) | |
| *G06F 3/0354* | (2013.01) | |
| *G09G 3/02* | (2006.01) | |
| *G06F 3/038* | (2013.01) | |
| *G02B 27/64* | (2006.01) | |

(Continued)

(52) U.S. Cl.
CPC ........... *G02B 27/20* (2013.01); *G02B 26/105* (2013.01); *G02B 27/646* (2013.01); *G06F 3/0346* (2013.01); *G06F 3/0386* (2013.01); *G06F 3/03542* (2013.01); *G09G 3/025* (2013.01); *G09G 3/346* (2013.01); *G02B 26/0833* (2013.01); *G09G 2320/0247* (2013.01)

(58) Field of Classification Search
CPC .......... G09G 3/02; G09G 3/025; G09G 3/346; G02B 27/20; G02B 26/105; G02B 26/0833; G06F 3/03542; G06F 3/0346
See application file for complete search history.

(56) References Cited

U.S. PATENT DOCUMENTS

| | | |
|---|---|---|
| 6,297,804 B1 | 10/2001 | Kashitani |
| 7,728,964 B2 | 6/2010 | Feinsod et al. |

(Continued)

FOREIGN PATENT DOCUMENTS

JP 2008233426 A 2/2008

OTHER PUBLICATIONS

Extended European Search Report of EP 18154213.5 dated May 11, 2018.

*Primary Examiner* — Daniel I Walsh
(74) *Attorney, Agent, or Firm* — Hoffmann and Baron, LLP

(57) ABSTRACT

A laser pointer for continuously drawing arbitrary shapes on a surface comprises a micro-electro-mechanical system (MEMS) mirror configured to deflect an emitted laser beam, wherein the deflection angle of the MEMS mirror can be altered by means of applying a set of drive values to the MEMS mirror; an orientation measurement unit configured to continuously determine a current orientation and to output said current orientation at an output; a memory being configured to store current orientations received from the orientation measurement unit as a set of orientation samples; and a drive circuit configured to generate said set of drive values by subtracting the current orientation from the set of orientation samples and to apply said set of drive values to the MEMS mirror.

33 Claims, 3 Drawing Sheets

(51) Int. Cl.
 *G02B 26/08* (2006.01)
 *G02B 26/10* (2006.01)
 *G09G 3/34* (2006.01)

(56) References Cited

U.S. PATENT DOCUMENTS

| | | |
|---|---|---|
| 8,413,077 B2 | 4/2013 | Yamamoto et al. |
| 2002/0125324 A1 | 9/2002 | Yavid et al. |
| 2002/0188955 A1* | 12/2002 | Thompson ............... H04N 5/76 725/110 |
| 2003/0052859 A1* | 3/2003 | Finley ................... G06F 3/0386 345/156 |
| 2003/0169233 A1* | 9/2003 | Hansen ................. G06F 3/0386 345/158 |
| 2005/0062939 A1* | 3/2005 | Tamura ................ G03B 21/145 353/69 |
| 2006/0146015 A1* | 7/2006 | Buchmann ......... G02B 26/0883 345/156 |
| 2006/0170650 A1* | 8/2006 | Madrange ............. G06F 3/0346 345/156 |
| 2006/0197756 A1* | 9/2006 | Sun .......................... G06F 3/042 345/179 |
| 2006/0250586 A1 | 11/2006 | Bani-Hashemi |
| 2006/0265120 A1* | 11/2006 | Coleman ................ G01C 21/18 702/153 |
| 2006/0266120 A1 | 11/2006 | Riegel et al. |
| 2007/0023527 A1* | 2/2007 | Harley ................... G02B 27/20 235/462.45 |
| 2008/0024443 A1* | 1/2008 | Horikiri ................ G06F 3/0386 345/157 |
| 2008/0048979 A1* | 2/2008 | Ruttenberg ........... G06F 1/1639 345/158 |
| 2008/0212154 A1* | 9/2008 | Feinsod ................. G02B 27/20 359/196.1 |
| 2008/0278445 A1 | 11/2008 | Sweetser et al. |
| 2009/0092161 A1* | 4/2009 | Hung ...................... G03B 21/28 372/29.01 |
| 2010/0128342 A1* | 5/2010 | Abramovitch ............ G02F 2/00 359/325 |
| 2011/0001701 A1* | 1/2011 | Nakano ................ G03B 21/006 345/157 |
| 2012/0081771 A1 | 4/2012 | Tanaka et al. |
| 2012/0113514 A1 | 5/2012 | Rodman |
| 2012/0293555 A1 | 11/2012 | Okano |
| 2013/0058092 A1* | 3/2013 | Anisimov .......... G02B 26/0816 362/259 |
| 2015/0177852 A1 | 6/2015 | Rankl |
| 2016/0041748 A1 | 2/2016 | Ball et al. |
| 2016/0140740 A1 | 5/2016 | Natori et al. |
| 2016/0269390 A1 | 9/2016 | Endo et al. |
| 2016/0370883 A1* | 12/2016 | Narita ................... G06F 3/0386 |
| 2017/0017309 A1 | 1/2017 | Okada |
| 2017/0184721 A1 | 6/2017 | Sun et al. |
| 2017/0357336 A1* | 12/2017 | McNeil ................. G06F 3/0425 |
| 2019/0235259 A1* | 8/2019 | Swatek ................. G02B 27/20 |

* cited by examiner

LASER POINTER

CROSS REFERENCE TO RELATED APPLICATIONS

This application is a divisional application of U.S. application Ser. No. 16/137,896, filed on Sep. 21, 2018, which claims the benefit of priority from European Patent Application Serial No. 18154213.5, filed on Jan. 30, 2018, each of which is incorporated herein by reference in their entirety.

FIELD OF INVENTION

The present subject matter relates to a laser pointer for drawing arbitrary shapes on a surface, e.g., a wall, board, or the like.

BACKGROUND OF THE INVENTION

During the last three decades, laser pointers became a necessity for presentations in business meetings, school events, and even public speeches. Laser pointers make it easy to highlight areas on presentation material that is usually hard to reach for the presenter by projecting a light spot in various colors—ranging from blue to green and red. These little light generators help to temporarily mark an area on a slide or poster, for which the presenter only has to move the projected light spot to an area of interest.

However, many presenters often find themselves in a pickle when they want to highlight an entire word because underlining a many characters is only possible by frantically waving your laser pointer, causing distraction to the audience and frustration for the presenter. Furthermore, adding words or drawings to slides or posters is not possible at all, and presenters have to resort to ancient technologies such as markers, highlighters or even adding paper scraps with adhesive tape to the presentation material on the wall.

In other areas, laser pointers have made technological advances. For example, US 2007/0023527 A1 describes a laser pointer that reduces hand tremors of a nervous presenter by counteracting the laser pointer's movement on a low scale. To this end, this laser pointer is equipped with an orientation sensor and a mirror system to invert the movement of the laser pointer, resulting in a more or less static laser spot on the wall. Additionally, this laser pointer can project predetermined shapes such as lines or circles by linearly driving the MEMS (micro-electro-mechanical systems) mirror.

Unfortunately, these predetermined shapes do not allow the presenter to express his or her thoughts or artistic freedom as he or she is restricted to lines and circles. While it would be straightforward to pre-program this laser pointer for additional shapes such as rectangles or even star shapes, the presenter would still be severely restricted to the options of the laser pointer.

SUMMARY

It is therefore an object of the disclosed subject matter to provide an improved laser pointer that overcomes the problems of the state of the art.

To this end, the disclosed subject matter provides a laser pointer of the aforementioned type, comprising:

a laser generation unit configured to emit a laser beam;
a micro-electro-mechanical system (MEMS) mirror configured to deflect the emitted laser beam, wherein the deflection angle of the MEMS mirror can be altered by means of applying a set of drive values to an input of the MEMS mirror;

an orientation measurement unit configured to continuously determine a current orientation of the laser pointer and to output said current orientation at an output;

a memory having an input that is connected to the output of the orientation measurement unit, the memory being configured to store current orientations received from the orientation measurement unit as a set of orientation samples;

a drive circuit having a first input connected to the memory for retrieving said set of orientation samples from the memory and a second input connected to the output of the orientation measurement unit for receiving the current orientation from the orientation measurement unit;

wherein the drive circuit is configured to generate said set of drive values by subtracting the current orientation from the set of orientation samples and to apply said set of drive values to the input of the MEMS mirror; and wherein the memory is configured to continuously store new orientation samples while the MEMS mirror is driven by the drive circuit, and the drive circuit is configured to update the set of drive values when a new orientation sample is stored in the memory.

Such a laser pointer provides an exhilarating experience for presenters as they now can draw and even write on their presentation material in real-time. By a simple wave of the hand, it is possible to project an arbitrarily curved line of light on a surface, e.g., a wall, board, or the like. This allows presenters to modify slides and write-ups in front of a live audience and also to delete the drawn shapes at will.

By using MEMS mirrors, previously marked areas on the wall, board, or the like can be "re-visited" by the light spot without the need for the presenter to actually move his or her hand. The drawn shape is memorized within the laser pointer and played back with the MEMS mirror, even during the process of drawing. This gives the presenter a completely new and previously unheard-of feeling of using his/her presentation material as he/she can develop the content of the slides on the fly.

To draw shapes that are bright on the wall and do not flicker, the same drive values may be applied multiple times to the MEMS mirror such that the MEMS mirror "re-draws" the same shape multiple times. If this is done in quick succession, the human eye cannot distinguish between the individual cycles of the MEMS mirror and a static shape is experienced. For this purpose, the drive circuit is optionally configured to repeatedly apply the set of drive values to the MEMS mirror.

To ensure that the MEMS mirror is capable of displaying all of the generated drive values, although this may not be necessary if some drive values can be disregarded, in a further embodiment the rate of applying the individual drive values of the set of drive values to the MEMS mirror is at least N times higher than the rate of storing the individual orientation samples in the memory, wherein N corresponds to the number of orientation samples stored in the memory.

A challenge in practically realizing the laser pointer of the aforementioned type may be the usage of power. The longer and larger the drawn shape becomes, the less bright it will be on the wall as the MEMS mirror takes a longer time to reproduce the shape. Thereby, also the amount of MEMS mirror cycles per time unit is reduced, resulting in a dim output of the laser pointer. To overcome this, the disclosed subject matter provides several variants.

Firstly, the memory can be configured to delete an orientation sample from the memory after a predetermined time.

By this means, the drawing "vanishes" after some time, making it temporary and freeing up memory space.

Secondly, the memory can be configured to delete the oldest orientation sample if a new orientation sample is stored. In this variant, the memory can have a maximum amount of storage such that also the amount of drive values to be generated is restricted. This is especially favorable if the presenter scribbles on the wall, board, or the like, as the laser pointer cannot suffer from an information overload, which would be near-impossible to reproduce with the MEMS mirror.

To further enhance the consistency of the intensity of the output and thus the quality of the drawn shape, the drive circuit optionally has a further output connected to a control input of the laser generation unit and is further configured to control an intensity of the emitted laser beam via said control input. Thereby, the drive circuit can adjust the intensity of the emitted laser beam to be proportional to the amount of drive values generated, i.e., increase the intensity if the drawn line becomes longer. For this purpose, the intensity of the laser pointer can be reduced in the beginning, e.g., to a value of 5%, 10%, 25%, or 50% of its maximum output capability.

This embodiment can also be used to provide "gaps" in the drawn shape, for example to provide a spacing when letters are written. The drive circuit can then specify that the intensity of the emitted laser beam is zero between specified drive values.

Sometimes it is also necessary for the presenter temporarily pause the drawing mode to focus on other parts of his or her presentation or to simply use the ordinary mode of projecting a single spot. Thus the laser pointer may optionally have an input device via which the storing of current orientations in the memory can be switched on and off.

The orientation sensor allows the laser pointer to record the changes in orientation, i.e., angular position, which are caused by the presenter tilting his or her hand holding the laser pointer. This embodiment is sufficient in most cases, as most of the movement of the laser pointer is caused by tilting the hand.

On the other hand, some presenters enjoy running from side to side with the laser pointer in front of the wall, board or the like. This causes also the written or drawn shape on the presentation material to move along with the presenter. In a further embodiment, the laser pointer may thus compensate its translatory movement. To this end, the orientation measurement unit is further configured to continuously determine a current position of the laser pointer, wherein the memory is further configured to store current positions received from the orientation measurement unit together with the current orientations as a set of orientation samples with position samples, and wherein the drive circuit is configured to generate said set of drive values based on the current orientation, the current position, and the set of orientation samples with position samples.

In most cases, the presenter is located at a constant distance in front of the wall, board, or the like, even if he or she moves from side to side. If the presenter also moves to and from his/her presentation material, this can cause a scaling problem for the projected shape. To overcome this scaling problem, which also affects to a lesser degree the aforementioned compensation of the translatory movement, the laser pointer optionally comprises a distance measurement unit configured to determine a current distance of the laser pointer from the surface, and to output said current distance at an output connected to an input of the memory and to an input of the drive circuit, wherein the memory is further configured to store current distances received from the distance measurement unit together with the current orientations and current positions as a set of orientation samples with position samples and distance samples, and wherein the drive circuit is configured to generate said set of drive values based on the current orientation, the current position, the current distance, and the set of orientation samples with position samples and distance samples.

Optionally, the laser pointer further comprises a sampler interposed between the orientation measurement unit and the memory, wherein the sampler is configured to output orientation samples at a constant rate to the memory for storing. This can be used to store current orientations at regular intervals and/or only when the change of current orientations exceeds a predetermined threshold, effectively reducing required memory size and the computational steps the drive circuit has to perform.

Further optionally, the laser pointer comprises a low-pass filter interposed between the orientation measurement unit and the memory. This serves to remove hand-tremor jitters from the drawn shape such that, e.g., lines can be drawn straighter. Optionally, such a low-pass filter may only be interposed between the orientation measurement unit and the memory and not between the orientation measurement unit and the drive circuit because the drive circuit needs the deviations even of small hand movements to compensate for hand tremors, such that the drawn shape can be hold still on the wall.

Further optionally, the laser pointer has at least two laser generation units, each configured for emitting a laser beam of a different wavelength onto said MEMS mirror. The user can thus chose the color of projecting the light, for example by means of a manual switch.

In this embodiment the drive circuit may optionally be configured to control the intensity of the laser beams emitted by the at least two laser generation units and to use each of the laser generation units for different subsets of the set of orientation samples. By means of this, the drive circuit can assign a certain color to a selected memory subset and a different color to a different—or overlapping, to mix colors—subset. For example, if the laser pointer is used for writing, one letter can be written in red and a different letter can be written in green.

Further optionally, the laser pointer has at least two MEMS mirrors, each configured for deflecting at least a part of said laser beam, wherein the drive circuit is configured to generate said set of drive values for each of the MEMS mirrors. This can be done either by means of arranging two MEMS mirrors in a serial manner or—for example with the use of a beam splitter—in a parallel manner. This can be used to overcome the limits in deflection angle of MEMS mirrors, which is typically max. 60°-120° when optically extending the optical scan angle. If two MEMS mirrors are used in parallel, one mirror could be used to project shapes on the far left and the other to project shapes on the far right; if two MEMS mirrors are used serially, the second one multiplies the deflection angle of the first.

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1B:
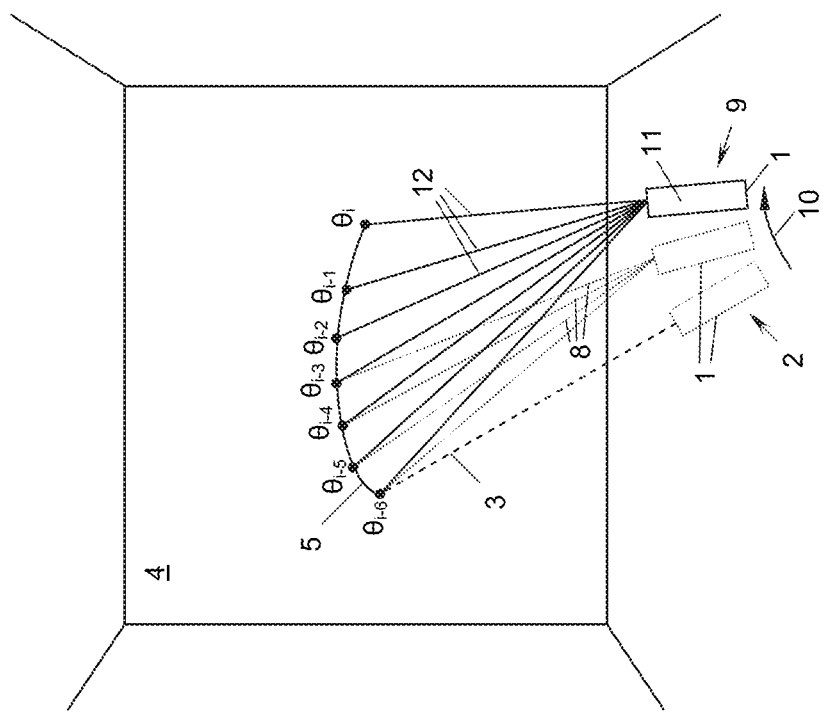
FIG. 1b shows the laser pointer of FIG. 1a after completing the drawing of the shape in a perspective view.
Figure 1A:
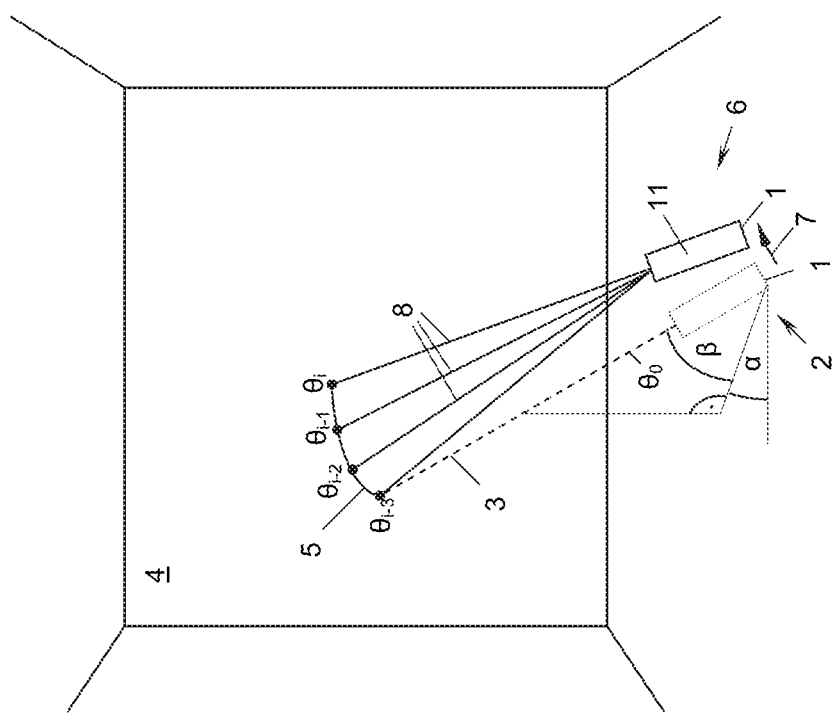
FIG. 1a shows a laser pointer according to the disclosed subject matter in the process of drawing a shape on a wall of a room in a perspective view.

FIG. 1a shows a laser pointer 1 in a first position 2 emitting a laser beam 3 onto a wall 4. Instead of a wall 4, the laser pointer 1 could also emit the laser beam 3 onto any kind of surface, such as a board, projection screen, poster, a slide projected by an external projector, or the like.

The laser pointer 1 is used to draw an arbitrary shape 5, in the case of FIG. 1a a curved line, onto the wall 4 by tilting the laser pointer 1 from a first orientation $\theta_0$ in the first position 2 to a second orientation $\theta_i$ in a second position 6 with a tilting movement 7, e.g., by tilting the hand holding the laser pointer 1. In the second position 6, a state-of-the-art laser pointer would naturally only emit one laser beam 8 to project one spot onto the wall 4. The laser pointer 1, however, is capable of deflecting the laser beam 8 along a movement that corresponds to the tilting movement 7 previously performed by the laser pointer 1 to "re-draw" the shape 5 onto the wall in the second position 6. This is done by emitting a fan of laser beams 8 in such a manner that not only the present orientation $\theta_i$ but all previous orientations $\theta_{i-1}$, $\theta_{i-2}$, ..., $\theta_0$ that were assumed by the laser pointer 1 between the first position 2 and the second position 6 are included in the fan of laser beams 8.

FIG. 1b shows that the laser pointer 1 moved even further from the first position 2 over the second position 6 to a third exemplary position 9 with a tilting movement 10 of the user's hand. Also in FIG. 1b, the laser pointer 1 emits a fan of laser beams 12 in such a manner that not only the present orientation $\theta_i$ but all previous orientations $\theta_{i-1}$, $\theta_{i-2}$, ..., $\theta_0$ that were assumed by the laser pointer 1 between the first position 2, the second position 6, and the third position 9 are included in the fan of laser beams 12.

It can be seen from FIG. 1b that while in the second position 6 the laser pointer 1 already re-drew the beginning of the shape 5, the complete shape 5 is now re-drawn in the third position 9. This allows the user to draw any arbitrary shape 5 in real-time, just like with pen on paper usage. It is not necessary for a user to first define the shape 5 to be projected by the tilting movement 10 and only then start the composed projection, as this would make drawing more complex shapes such as letters and/or drawing shapes precisely at certain target positions on a wall very hard.

Figure 2:
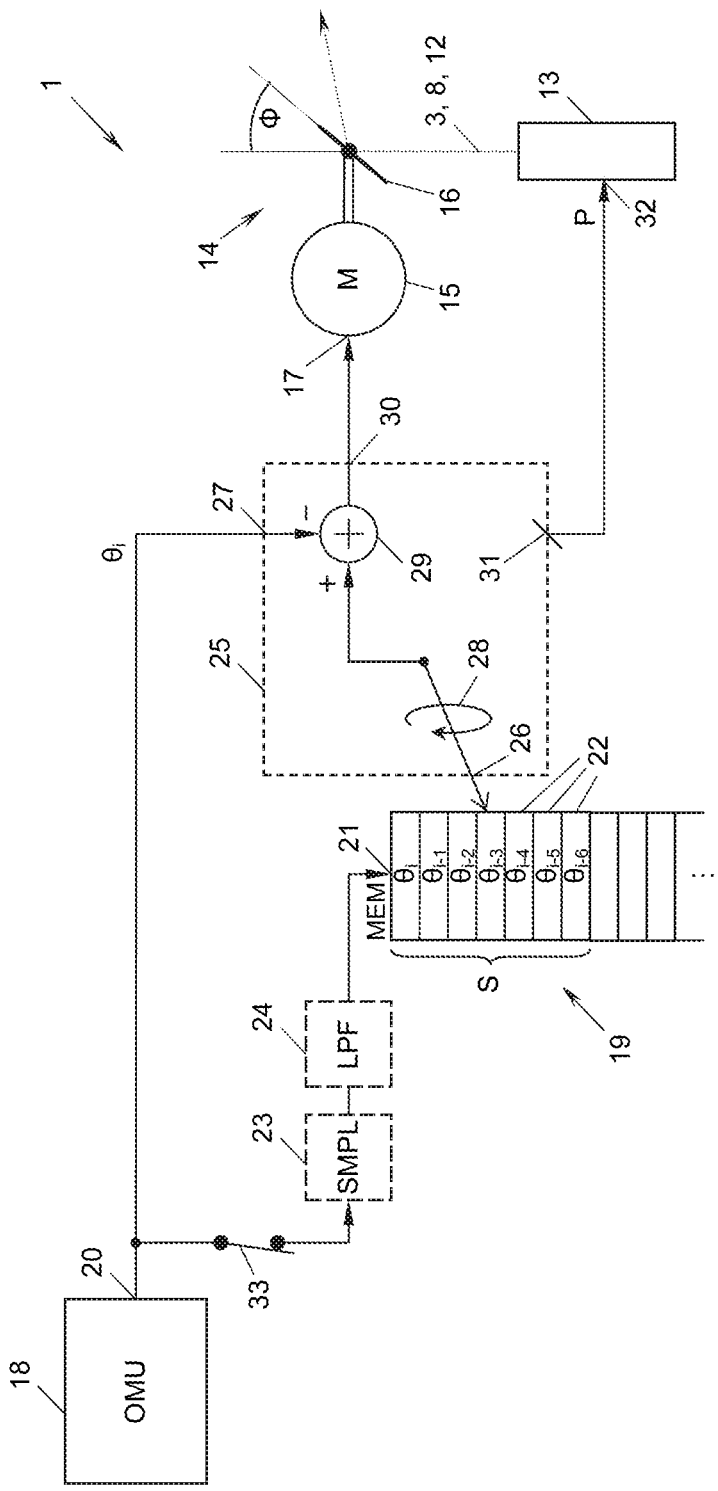
FIG. 2 shows the components of a first embodiment of the laser pointer of FIGS. 1a and 1b in a schematic circuit diagram.

FIG. 2 shows the components of the laser pointer 1 that allow the real-time drawing of shapes 5 as described above with reference to FIGS. 1a and 1b. The laser pointer 1 comprises a laser generation unit 13 that emits the laser beam 3, 8, 12. The laser generation unit 13 can be of any type known in the state of the art, for example a laser diode, a diode-pumped solid-state frequency-doubled laser, a light-emitting diode, or a superluminescent light-emitting diode. The laser beam 3, 8, 12 can be of any wavelength to produce any desired color.

The laser beam 3, 8, 12 is emitted onto a MEMS (micro-electro-mechanical system) mirror 14 comprising a motor component 15 and a mirror component 16. The motor component 15 and the mirror component 16 are commonly embodied in a single element as known in the state of the art.

The deflection angle $\Phi$ of the MEMS mirror 14 can be electromechanically altered by applying a set of drive values DV to an input 17 of the MEMS mirror 14. By altering the deflection angle $\gamma$, the laser beam 3, 8, 12 can be dynamically deflected to produce the fan of laser beams 8, 12 shown in FIGS. 1a and 1b. Generally, the MEMS mirror can be rotated about two axes to allow a deflection of the laser beam 3, 8, 12 on a two-dimensional area, i.e., the deflection angle $\Phi$ is an angle in space.

To determine the current orientation $\theta_i$ of the laser pointer 1, an orientation measurement unit 18 is used. The orientation measurement unit 18 is fixated in a casing 11 of the laser pointer 1 which houses the components shown in FIG. 2. The orientation measurement unit 18 is capable of determining angular movements of the laser pointer 1 and can for this purpose be an IMU (inertial measurement unit), one or more gyroscopes, one or more magnetometers, a camera viewing and processing the environment of the laser pointer 1, or the like.

The orientation measurement unit 18 can determine the current orientation $\theta_i$ of the laser pointer 1 in an absolute or relative manner. For an absolute determination of the orientation $\theta_i$ in space, for example a set of two angles $\alpha$, $\beta$ around reference axes can be used, see FIG. 1a. To determine a relative orientation $\theta_i$, it is only necessary to define a reference orientation, for example the orientation $\theta_0$ in the first position 2 (FIG. 1a), and determine all following orientations $\theta_i$ with respect to this reference orientation $\theta_0$.

To record the laser pointer's movement 7, 10 from one position to the next, a sequence of current orientations $\theta_i$ is stored in a memory 19. To this end, an output 20 of the orientation measurement unit 18 is connected to an input 21 of the memory 19. The memory 19 can be of any type known in the state of the art, for example embodied as a digital database on a data storage, as a shift register, or as a circular buffer.

The memory 19 stores the current orientations $\theta_i$ output by the orientation measurement unit 18 as a set S of orientation samples 22. While the current orientations $\theta_i$ can be output in any form, either as discrete values output at regular or irregular times or even as an analog signal, the set S of orientation samples 22 is a set of discrete values. In the simplest case a sequence of past discrete current orientations $\theta_i$ is the same as the set S of orientation samples 22.

In the embodiment of FIG. 2, an optional sampler 23 is interposed between the orientation measurement unit 18 and the memory 19 to transform the current orientations $\theta_i$ into the set S of orientation samples 22. The sampler 23 outputs the orientation samples 22 at a constant rate to the memory 19 for storing such that the memory 19 has no further need of processing the current orientations $\theta_i$.

Depending on the method to generate the set S of orientation samples 22, the orientation samples 22 can either have a fixed span of time between their respective times of recording, e.g., each orientation sample 22 is recorded 1 ms after the preceding orientation sample 22, or the orientation samples 22 can have a fixed angular difference with respect to each other, e.g., each orientation sample 22 is recorded 0.01° after the preceding orientation sample 22. Other criteria are possible, too.

Furthermore, a low-pass filter 24 can optionally be interposed between the orientation measurement unit 18 and the memory 19. The low-pass filter 24 can be used to eliminate jitter from recorded lines such that only straight lines or smooth movements are recorded.

To generate the drive values DV for driving the MEMS mirror 14, a drive circuit 25 is used. The drive circuit 25 has a first and a second input 26, 27. Via the first input 26, the drive circuit 25 is capable of retrieving the con-tents of the memory 19. Depending on the type of memory 19 used, the drive circuit 25 can either read out the whole set S of orientation samples 22 at once, for example by a data transfer of a digital list, or sequentially retrieve the orientation samples 22 ($\theta_i$, $\theta_{i-1}$, $\theta_{i-2}$, ...) until the last orientation sample $\theta_0$ is reached, whereupon the drive circuit 25 re-starts the step of retrieving at the first orientation sample $\theta_i$ as is indicated by arrow 28. Via the second input 27 the drive circuit 15 receives, directly from the orientation measurement unit 18, the current orientation $\theta_i$.

For generating the drive values DV, the drive circuit 25 comprises a subtractor 29, which generates a set of drive values DV by subtracting the current orientation $\theta_i$ from each orientation sample 22 retrieved from the memory 19. It is to be understood that the term "subtractor" is only used for purposes of visualization as the subtractor 29 can assume a lot of other functions such as converting the result of the subtraction into a corresponding voltage for driving the MEMS mirror, applying scaling functions, or the like. Once the set of drive values DV is generated, it is applied—as a sequence of individual drive values DV each corresponding to one orientation sample 22 minus the current orientation $\theta_i$—to the input 17 of the MEMS mirror 14 via an output 30 of the drive circuit 25.

It is further to be understood that all the aforementioned steps of determining and storing current orientations $\theta_i$, emitting the laser beam 3, 8, 12, and driving the MEMS mirror 15 are performed simultaneously to allow a real-time drawing of the shape 5 on the wall 4 as shown in FIGS. 1a and 1b. For this reason it is especially provided that the memory 19 is configured to continuously store new orientation samples 22 while the MEMS mirror 14 is driven by the drive circuit 25, and the drive circuit 25 updates the set of drive values DV at least when a new orientation sample 22 is stored in the memory 19.

The drive circuit 25 can comprise additional functions such as a pattern recognition algorithm that can determine if the user wants to draw a circle or a line. In this case, the drive values DV are manipulated such that instead of a crooked circle or a wiggly line a perfectly round circle or a straight line is output. The same can be utilized for letters, which is especially advantageous as writing with a laser pointer can be challenging for a presenter. To this end, even different typesets could be chosen such that the user's handwriting can be displayed in "Courier" or "Arial" typeset, for example.

Furthermore, the drive circuit 25 can "re-arrange" the drive values DV within the set of drive values DV to determine the fastest way for the MEMS mirror 14 to reproduce the contents of the memory 19, i.e., the MEMS mirror 14 does not have to reproduce the movement 7, 10 in a chronological manner but alternatively can do this in a more efficient way. This is especially useful if the movement 7, 10 contains multiple disconnected shapes such as letters.

When the drive circuit 25 outputs the set of drive values DV to the MEMS mirror 14, it does so repeatedly such that the MEMS mirror 14 projects the fan of laser beams 8, 12 multiple times. For example, the same set of drive values DV can be repeatedly output to the MEMS mirror 14 as long as the content of the memory 19 or the current orientation $\theta_i$ does not change.

Furthermore, the computation of the subtraction by means of the subtractor 29 can be performed continuously even with changing current orientations $\theta_i$. For example, from a first part of the set S of orientation samples 22 a current orientation $\theta_i$ is subtracted and from a second part of the set S of orientation samples 22 a different current orientation $\theta_j$ is subtracted if a change in current orientation $\theta_i$ occurred in the middle of retrieving the set S.

In most embodiments, the rate of applying the individual drive values DV of the set of drive values DV to the MEMS mirror 14 is at least N times higher than the rate of storing the individual orientation samples 22 of the set S in the memory 19, wherein N corresponds to the number of orientation samples 22 stored in the memory 19, i.e., the size of the set S.

It can be seen that a cycle of outputting a set of drive values DV by the MEMS mirror 14 takes longer if there are a lot of drive values DV in the set of drive values DV. As such, the rate of outputting sets of drive values DV decreases if long shapes 5 are drawn. Thereby, also the intensity of the shape 5 as displayed on the wall 4 reduces. As a practical example, while a short shape 5 can be repeated 1000 times per second, a large shape 5 with 10 times the length of the short shape 5 can only be repeated 100 times per second, meaning also the intensity is 10 times lower for the long shape 5. Various measures can be taken to solve this issue.

Firstly, the memory 19 can delete each orientation sample 22 from the memory 19 after a predetermined time, for example after 10 seconds. This reduces the amount of orientation samples 22 in the memory 19 and thus also the amount of drive values DV in the set of drive values DV.

Secondly, the memory 19 can delete the oldest orientation sample 22 from the memory 19 if a new orientation sample 22 is stored. The set S of orientation samples 22 can thus be restricted to a predefined size, for example N=1000 orientation samples 22. If the 1001-st orientation sample 22 is to be stored, the oldest of the 1000 previously stored orientation samples 22 is deleted. This also limits the amount of orientation samples 22 in the memory 19 and thus the amount of drive values DV in the set of drive values DV.

In addition to these two measures, the drive circuit 25 can have a further output 31 connected to a control input 32 of the laser generation unit 13 and via this connection control the intensity P of the emitted laser beam 3, 8, 12. For example, the drive circuit 25 can control the intensity P of the emitted laser beam 3, 8, 12 such that the intensity P of the emitted laser beam 3, 8, 12 is proportional to the number of drive values DV in said set of drive values DV. In this way, the drive circuit 25 can reduce the intensity P of the laser beams 3, 8, 12 emitted by the laser generation unit 13 when driving the MEMS mirror 14 for short shapes 5 and only use the full intensity P for the laser beams 3, 8, 12 when driving the MEMS mirror 14 for long shapes 5.

To allow the user to draw a multitude of independent shapes 5, the laser pointer 1 has an input device 33 via which the storing of current orientations $\theta_i$ in the memory 19 can be switched on and off. The input device can for this purpose be a simple button or a touchpad.

Figure 3:
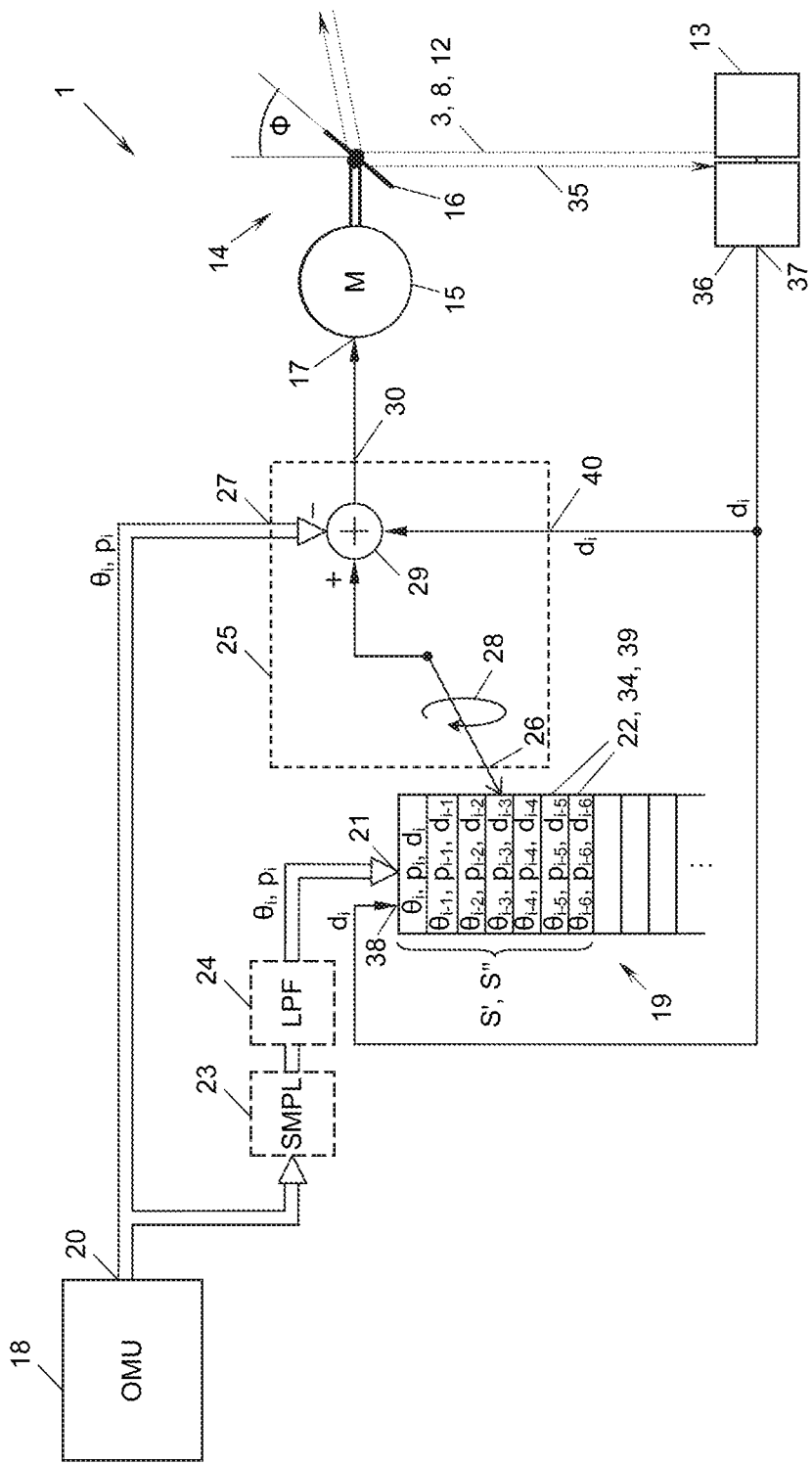
FIG. 3 shows the components of a second embodiment of the laser pointer of FIGS. 1a and 1b in a schematic circuit diagram.

FIG. 3 shows a variant of the laser pointer of FIG. 2, in which the orientation measurement unit 18 can additionally continuously determine a translatory shift, i.e., a current position $p_i$. For this purpose, common IMUs, accelerometers, magnetometers, or dead-reckoning systems can be used, or cameras recording and processing the environment. Alternatively or additionally, GPS coordinates could be used for determining the current position. Also, the laser pointer 1 could be connected with a nearby provider of reference signals, for example a mobile phone, which can act as a beacon and thus be used to determine the relative distance of the laser pointer 1 to the mobile phone.

Current positions $p_i$ are received by the memory 19 from the orientation measurement unit 18 and stored together with the current orientations $\theta_i$ as a set S' of orientation samples 22 with position samples 34. The aforementioned sampler 23 and low-pass filter 24 can be utilized for the current positions $p_i$, too.

To compute the drive values DV, the drive circuit 25 receives in addition to the current orientation $\theta_i$ also the current position $p_i$. The computation of the drive values DV can in this case not be performed with a subtraction, but is still simple enough to be determined by utilizing the principles of basic geometry.

Furthermore, the laser pointer 1 can also autonomously determine its distance $d_i$ to the wall 4 by measuring the time-of-flight between emitting the beam 3, 8, 12 and receiving the reflection 35 of the laser beam 3, 8, 12 from the wall 4 in a distance measurement unit 36 of the laser generation unit 13. Such systems are commonly known as LIDAR (light detection and ranging) systems.

Depending on the embodiment, the laser generation unit 13 and the distance measurement unit 36 can be two distinct but connected components that can interact with each other, e.g., the laser generation unit 13 can communicate a time of generating the laser beam 3, 8, 12 to the distance measurement unit 36 such that the distance measurement unit 36 can determine a time of flight of the laser beam 3, 8, 12 after receiving the corresponding reflection. The laser generation unit 13 and the distance measurement unit 36 could also be embodied as a single unit.

The distance measurement unit 36 outputs the current distance $d_i$ at an output 37 thereof to an input 38 of the memory 19. The memory 19 then stores the current distances $d_i$ received from the distance measurement unit 36 together with the current orientations $\theta_i$ and current positions $p_i$ as a set S" of orientation samples 22 with position samples 34 and distance samples 39.

The drive circuit 25 also receives the current distances di at an input 40 and generates the set of drive values DV based on the current orientation $\theta_i$, the current position $p_i$, the current distance $d_i$, and the set of orientation samples 22 with position samples 34 and distance samples 39, again by means of applying basic geometry.

The laser pointer 1 can also comprise extended functions by employing multiple laser generation units 13 and/or multiple MEMS mirrors 14. In one embodiment (not shown), the laser pointer 1 has at least two laser generation units 13, each emitting a laser beam 3, 8, 12 of a different wave-length onto said MEMS mirror 14. The user can then, for example, manually choose to display the shapes 5 in green, blue, orange, red, or any other desired color provided by the multiple laser generation units 13. A mixing of colors is possible, too.

It is even possible to vary the color within the same shape 5 (or for different shapes, e.g., different letters). To this end, the drive circuit 25 can control the intensity P of the laser beams 3, 8, 12 emitted by at least two laser generation units 13 and to use each of the multiple laser generation units 13 for different subsets of the set of drive values DV.

The field of view of a MEMS mirror is typically 60°-120° when optically extending the optical scan angle. While this is enough for some applications, the MEMS mirror 14 can generally deflect the laser beam 3, 8, 12 over a wider spatial area. To this end, the laser pointer 1 can have at least two MEMS mirrors 14, each deflecting at least a part of said laser beam 3, 8, 12, and the drive circuit 25 splits the set of drive values DV into partial sets for each of the MEMS mirrors 14. For example, a beam splitter can be used to provide a part of the laser beam 3, 8, 12 for each MEMS mirror. The MEMS mirrors could alternatively also be cascaded to achieve a different or widespread behavior of deflection.

The disclosed subject matter is not restricted to the specific embodiments described in detail herein, but encompasses all variants, combinations and modifications thereof that fall within the framework of the appended claims.

What is claimed is:

1. A laser pointer, comprising:
a casing;
an orientation measurement unit coupled to the casing;
in the casing, a laser generation unit configured to emit a laser beam;
in the casing, a micro-electro-mechanical system (MEMS) mirror controlled by a drive circuit, the MEMS mirror and drive circuit being configured to draw a shape onto a surface in at least a second orientation of the laser pointer by deflecting the emitted laser beam along a movement that corresponds to a tilting movement previously performed by the laser pointer from at least a first orientation to the at least second orientation;
wherein the tilting movement is determined by the orientation measurement unit and stored in a memory of the laser pointer for being drawn as said shape by the MEMS mirror and drive circuit;
wherein a deflection angle of the MEMS mirror can be altered by means of applying a set of drive values to an input of the MEMS mirror;
wherein the orientation measurement unit is configured to continuously determine a current orientation of the laser pointer and to output said current orientation at an output;
wherein the memory has an input that is connected to the output of the orientation measurement unit, the memory being configured to store current orientations received from the orientation measurement unit as a set of orientation samples;
wherein the drive circuit has a first input connected to the memory for retrieving said set of orientation samples from the memory and a second input connected to the output of the orientation measurement unit for receiving the current orientation from the orientation measurement unit;
wherein the drive circuit is configured to generate said set of drive values by subtracting the current orientation from the set of orientation samples and to apply said set of drive values to the input of the MEMS mirror;
wherein the memory is configured to continuously store new orientation samples while the MEMS mirror is driven by the drive circuit, and the drive circuit is configured to update the set of drive values when a new orientation sample is stored in the memory; and
wherein the rate of applying the individual drive values of the set of drive values to the MEMS mirror is at least N times higher than the rate of storing the individual orientation samples in the memory, wherein N corresponds to the number of orientation samples stored in the memory.

2. The laser pointer according to claim 1, wherein the drive circuit is configured to repeatedly apply the set of drive values to the MEMS mirror.

3. The laser pointer according to claim 1, wherein the memory is configured to delete an orientation sample from the memory after a predetermined time.

4. The laser pointer according to claim 1, wherein the memory is configured to delete the oldest orientation sample if a new orientation sample is stored.

5. The laser pointer according to claim 1, wherein the drive circuit has a further output connected to a control input of the laser generation unit and is further configured to control an intensity of the emitted laser beam via said control input.

6. The laser pointer according to claim 1, wherein the drive circuit has a further output connected to a control input of the laser generation unit and is further configured to control an intensity of the emitted laser beam via said control input, and wherein the drive circuit is configured to control the intensity of the emitted laser beam such that the intensity of the emitted laser beam is proportional to the number of drive values in said set of drive values.

7. The laser pointer according to claim 1, wherein the laser pointer has an input device via which the storing of current orientations in the memory can be switched on and off.

8. The laser pointer according to claim 1, wherein the orientation measurement unit is further configured to continuously determine a current position of the laser pointer,
wherein the memory is further configured to store current positions received from the orientation measurement unit together with the current orientations as a set of orientation samples with position samples, and
wherein the drive circuit is configured to generate said set of drive values based on the current orientation, the current position, and the set of orientation samples with position samples.

9. The laser pointer according to claim 8, wherein the laser pointer further comprises a distance measurement unit configured to determine a current distance of the laser pointer from the surface, and to output said current distance at an output connected to an input of the memory and to an input of the drive circuit,
wherein the memory is further configured to store current distances received from the distance measurement unit together with the current orientations and current positions as a set of orientation samples with position samples and distance samples, and
wherein the drive circuit is configured to generate said set of drive values based on the current orientation, the current position, the current distance, and the set of orientation samples with position samples and distance samples.

10. The laser pointer according to claim 8, wherein the drive circuit is configured to repeatedly apply the set of drive values to the MEMS mirror.

11. The laser pointer according to claim 8, wherein the memory is configured to delete a position sample from the memory after a predetermined time.

12. The laser pointer according to claim 8, wherein the memory is configured to delete the oldest position sample if a new position sample is stored.

13. The laser pointer according to claim 1, wherein the laser pointer further comprises a sampler interposed between the orientation measurement unit and the memory,
wherein the sampler is configured to output orientation samples at a constant rate to the memory for storing.

14. The laser pointer according to claim 1, wherein the laser pointer further comprises a low-pass filter interposed between the orientation measurement unit and the memory.

15. The laser pointer according to claim 1, wherein the laser pointer has at least two laser generation units, each configured for emitting a laser beam of a different wavelength onto said MEMS mirror.

16. The laser pointer according to claim 15, wherein the drive circuit is configured to control the intensity of the laser beams emitted by the at least two laser generation units and to use each of the laser generation units for different subsets of the set of orientation samples.

17. The laser pointer according to claim 1, wherein the laser pointer has at least two MEMS mirrors, each configured for deflecting at least a part of said laser beam,
wherein the drive circuit is configured to generate said set of drive values for each of the MEMS mirrors.

18. The laser pointer according to claim 1, wherein the drive circuit has a further output connected to a control input of the laser generation unit and is further configured to control an intensity of the emitted laser beam via said control input.

19. The laser pointer according to claim 1, wherein the laser pointer further comprises a low-pass filter interposed between the orientation measurement unit and the memory.

20. The laser pointer according to claim 1, wherein the orientation measurement unit comprises a camera configured to view and process an environment of the laser pointer.

21. The laser pointer according to claim 1, wherein the laser pointer has at least two laser generation units, each configured for emitting a laser beam of a different wavelength onto said MEMS mirror.

22. A laser pointer, comprising:
a casing;
an orientation measurement unit coupled to the casing;
in the casing, a laser generation unit configured to emit a laser beam;
in the casing, a micro-electro-mechanical system (MEMS) mirror controlled by a drive circuit, the MEMS mirror and drive circuit being configured to draw a shape onto a surface in at least a second orientation of the laser pointer by deflecting the emitted laser beam along a movement that corresponds to a tilting movement previously performed by the laser pointer from at least a first orientation to the at least second orientation;
wherein the tilting movement is determined by the orientation measurement unit and stored in a memory of the laser pointer for being drawn as said shape by the MEMS mirror and drive circuit;
wherein a deflection angle of the MEMS mirror can be altered by means of applying a set of drive values to an input of the MEMS mirror;
wherein the orientation measurement unit is configured to continuously determine a current orientation of the laser pointer and to output said current orientation at an output;
wherein the memory has an input that is connected to the output of the orientation measurement unit, the memory being configured to store current orientations received from the orientation measurement unit as a set of orientation samples;
wherein the drive circuit has a first input connected to the memory for retrieving said set of orientation samples from the memory and a second input connected to the output of the orientation measurement unit for receiving the current orientation from the orientation measurement unit;
wherein the drive circuit is configured to generate said set of drive values by subtracting the current orientation from the set of orientation samples and to apply said set of drive values to the input of the MEMS mirror;

wherein the memory is configured to continuously store new orientation samples while the MEMS mirror is driven by the drive circuit, and the drive circuit is configured to update the set of drive values when a new orientation sample is stored in the memory;

wherein the drive circuit has a further output connected to a control input of the laser generation unit and is further configured to control an intensity of the emitted laser beam via said control input, and wherein the drive circuit is configured to control the intensity of the emitted laser beam such that the intensity of the emitted laser beam is proportional to the number of drive values in said set of drive values.

23. The laser pointer according to claim 22, wherein the drive circuit is configured to repeatedly apply the set of drive values to the MEMS mirror.

24. The laser pointer according to claim 22, wherein the memory is configured to delete an orientation sample from the memory after a predetermined time.

25. The laser pointer according to claim 22, wherein the memory is configured to delete the oldest orientation sample if a new orientation sample is stored.

26. The laser pointer according to claim 22, wherein the orientation measurement unit is further configured to continuously determine a current position of the laser pointer,
wherein the memory is further configured to store current positions received from the orientation measurement unit together with the current orientations as a set of orientation samples with position samples, and
wherein the drive circuit is configured to generate said set of drive values based on the current orientation, the current position, and the set of orientation samples with position samples.

27. The laser pointer according to claim 26, wherein the laser pointer further comprises a distance measurement unit configured to determine a current distance of the laser pointer from the surface, and to output said current distance at an output connected to an input of the memory and to an input of the drive circuit,
wherein the memory is further configured to store current distances received from the distance measurement unit together with the current orientations and current positions as a set of orientation samples with position samples and distance samples, and
wherein the drive circuit is configured to generate said set of drive values based on the current orientation, the current position, the current distance, and the set of orientation samples with position samples and distance samples.

28. The laser pointer according to claim 22, wherein the laser pointer has at least two laser generation units, each configured for emitting a laser beam of a different wavelength onto said MEMS mirror.

29. The laser pointer according to claim 28, wherein the drive circuit is configured to control the intensity of the laser beams emitted by the at least two laser generation units and to use each of the laser generation units for different subsets of the set of orientation samples.

30. The laser pointer according to claim 22, wherein the laser pointer has at least two MEMS mirrors, each configured for deflecting at least a part of said laser beam,
wherein the drive circuit is configured to generate said set of drive values for each of the MEMS mirrors.

31. The laser pointer according to claim 22, wherein the orientation measurement unit comprises a camera configured to view and process an environment of the laser pointer.

32. A laser pointer comprising:
a laser generation unit configured to emit a laser beam;
a micro-electro-mechanical system (MEMS) mirror configured to deflect the emitted laser beam, wherein the deflection angle of the MEMS mirror can be altered by means of applying a set of drive values to an input of the MEMS mirror;
an orientation measurement unit configured to continuously determine a current orientation of the laser pointer and to output said current orientation at an output;
a memory having an input that is connected to the output of the orientation measurement unit, the memory being configured to store current orientations received from the orientation measurement unit as a set of orientation samples;
a drive circuit having a first input connected to the memory for retrieving said set of orientation samples from the memory and a second input connected to the output of the orientation measurement unit for receiving the current orientation from the orientation measurement unit;
wherein the drive circuit is configured to generate said set of drive values by subtracting the current orientation from the set of orientation samples and to apply said set of drive values to the input of the MEMS mirror;
wherein the memory is configured to continuously store new orientation samples while the MEMS mirror is driven by the drive circuit, and the drive circuit is configured to update the set of drive values when a new orientation sample is stored in the memory; and
wherein the rate of applying the drive values of the set of drive values to the MEMS mirror is at least N times higher than the rate of storing the orientation samples in the memory, wherein N corresponds to the number of orientation samples stored in the memory.

33. A laser pointer comprising:
a laser generation unit configured to emit a laser beam;
a micro-electro-mechanical system (MEMS) mirror configured to deflect the emitted laser beam, wherein the deflection angle of the MEMS mirror can be altered by means of applying a set of a number of drive values to an input of the MEMS mirror;
an orientation measurement unit configured to continuously determine a current orientation of the laser pointer and to output said current orientation at an output;
a memory having an input that is connected to the output of the orientation measurement unit, the memory being configured to store current orientations received from the orientation measurement unit as a set of orientation samples;
a drive circuit having a first input connected to the memory for retrieving said set of orientation samples from the memory and a second input connected to the output of the orientation measurement unit for receiving the current orientation from the orientation measurement unit;
wherein the drive circuit is configured to generate said set of drive values by subtracting the current orientation from the set of orientation samples and to apply said set of drive values to the input of the MEMS mirror;
wherein the memory is configured to continuously store new orientation samples while the MEMS mirror is driven by the drive circuit, and the drive circuit is configured to update the set of drive values when a new orientation sample is stored in the memory;

wherein the drive circuit has a further output connected to a control input of the laser generation unit and is further configured to control an intensity of the emitted laser beam via said control input such that the intensity of the emitted laser beam is proportional to the number of drive values in said set of drive values.

\* \* \* \* \*